July 27, 1965   L. L. LANDER, JR   3,196,670
APPARATUS FOR MEASURING STRESS-RUPTURE PROPERTIES OF PLASTICS
Filed Feb. 27, 1962   3 Sheets-Sheet 1

INVENTOR.
LOUIS L. LANDER, JR.
BY
*James C. Arrantes*
ATTORNEY

INVENTOR.
LOUIS L. LANDER, JR.

INVENTOR.
LOUIS L. LANDER, JR.

BY

ATTORNEY

United States Patent Office 3,196,670
Patented July 27, 1965

3,196,670
APPARATUS FOR MEASURING STRESS-RUPTURE PROPERTIES OF PLASTICS
Louis L. Lander, Jr., Washington Township, Morris County, N.J., assignor to Union Carbide Corporation, a corporation of New York
Filed Feb. 27, 1962, Ser. No. 175,937
4 Claims. (Cl. 73—95)

This invention relates to an apparatus for determining the stress-rupture properties of plastics. More particularly, this invention relates to an apparatus for determining the stress-rupture properties of plastic material as a function of stress, temperature and the medium which is in contact with the plastic material.

The problem of environmental, stress-rupture is prevalent with respect to a wide variety of plastic material. As an illustration, shaped articles manufactured from polyethylene, which are otherwise desirable as they are of relatively light weight and have excellent flexibility over a wide range of temperatures, have been found to undergo undesirable stress-rupturing. That is, shaped polyethylene articles have a tendency to rupture when subjected to stress in the presence of certain environments, as for example, household detergents. For obvious reasons, knowledge of the amount of stress that a particular plastic material can undergo without rupturing, in a specific environment and at a specific temperature, is of prime importance in determining the ultimate end use of the material.

The present invention provides an apparatus for determining the resistivity to stress-rupture possessed by plastic materials in a specific environment and at a specific temperature. The apparatus of this invention provides for the simultaneous testing of a plurality of specimens of plastic material by which is determined the extent of their resistivity to rupture while under stress at a desired temperature and while in a specific environment, as for example, in a liquid environment or in a solid, particulate material environment.

The apparatus of the present invention will be more fully understood by the description which follows taken in conjunction with the accompanying drawings wherein.

Figure 1:
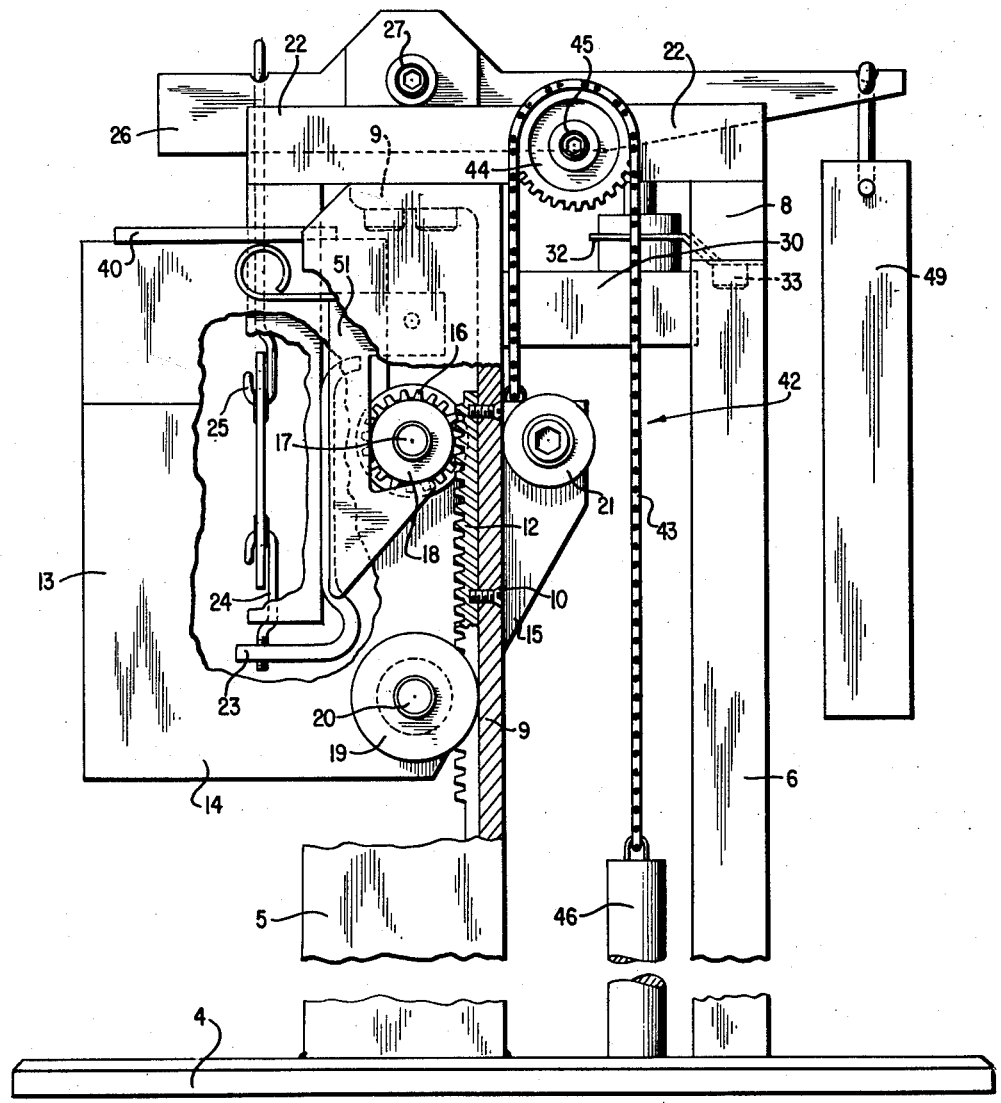
FIGURE 1 is a side view in elevation of one embodiment of the apparatus of this invention with part of the frame and part of the tank, which serves as a container for the medium in which the specimens are tested, broken away.
Figure 2:
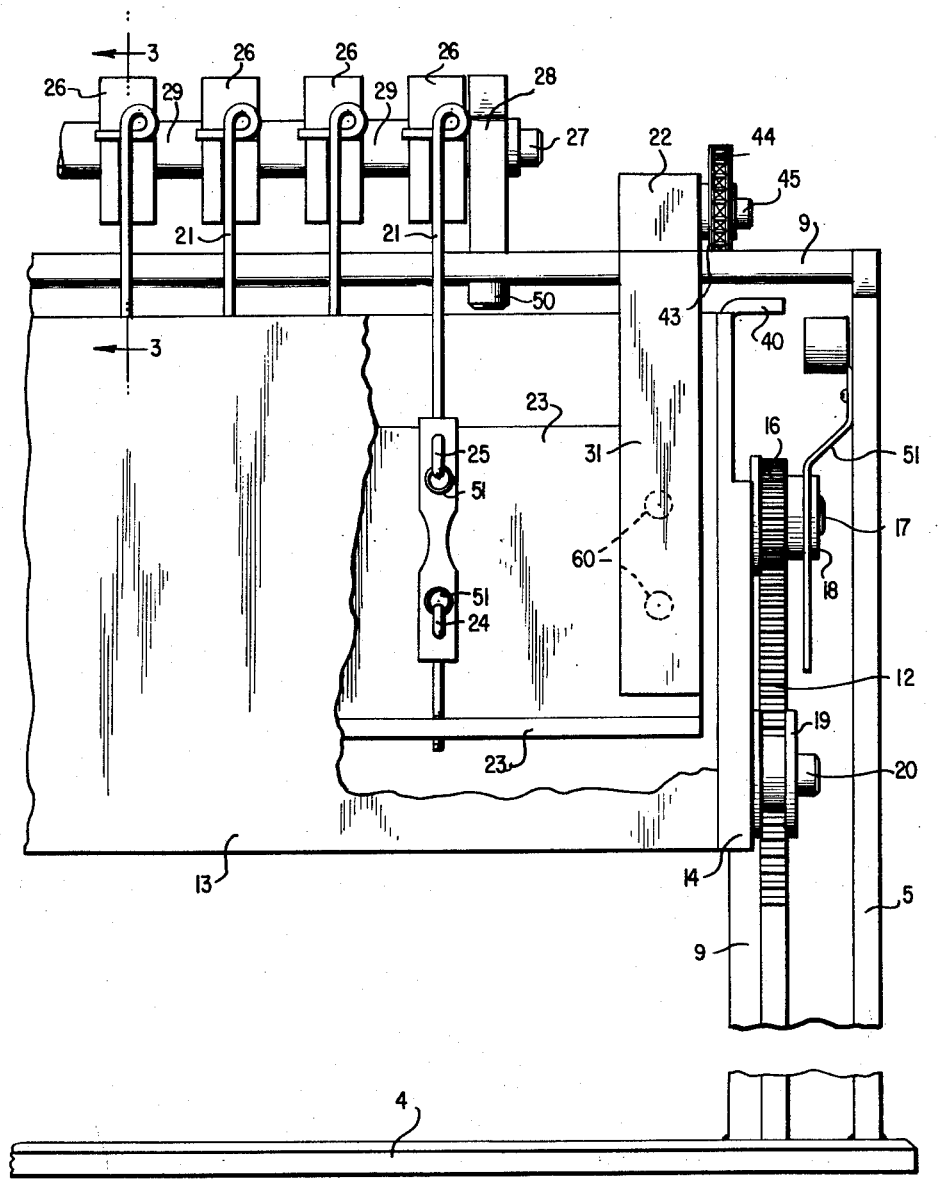
FIGURE 2 is a front view in elevation of the apparatus which is shown in FIGURE 1 with parts of the tank broken away.
Figure 3:
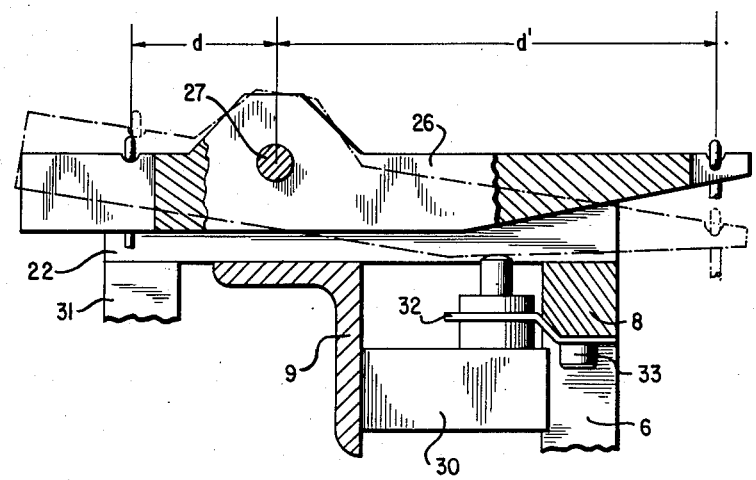
FIGURE 3 is a section taken along line 3—3 of FIGURE 2.

Referring now to FIGURES 1, 2 and 3, and more specifically referring to FIGURES 1 and 2, of the accompanying drawings, there is shown an apparatus having a base 4 with vertical, rigid frame members 5 and 6, rigid frame 5 being an angle iron, integrally mounted on base 4 at an end thereof. At the opposite end (not shown) of base 4 and at the same relative position thereon, there are integrally mounted on base 4, vertical, rigid frame members (not shown) which are complementary to vertical frame members 5 and 6. Vertical frame members 5 and 6, and also the complementary vertical frame members (not shown) are spaced, one from another, providing sufficient space to position therebetween microswitches, one of which is shown more clearly in FIGURE 3 and is identified by numeral 30. The function of the microswitches will be described subsequently.

Vertical frame member 6 is connected to its complementary vertical frame member (not shown) by rigid bar 8 which, at one end, rests on and is firmly connected to vertical frame member 6 and, at its opposite end, rests on and is firmly connected to the vertical frame member (not shown) which is complementary to vertical frame member 6.

Vertical frame member 5 is connected to its complementary vertical frame member (not shown) by an angle iron 9 which, at one end rests on and is firmly connected to the vertical frame member 5 and, at its opposite end, rests on and is firmly connected to the vertical frame member (not shown) which is complementary to vertical frame member 5.

Base 4 along with vertical, rigid frame members 5 and 6, their complementary vertical, rigid frame members (not shown), rigid bar 8 and rigid angle iron 9 form the main supporting frame of that embodiment of the apparatus of the present invention which is shown in the accompanying drawings.

Vertically, along the frame of the vertical frame member 5, which is an angle iron, and in the same manner on the vertical frame member (not shown) which is complementary to vertical frame member 5, and rigidly attached thereto by means of set screws, identified in FIGURE 1 by numeral 10, is gear rack 12 (only one such gear rack is shown in the drawings) which provide a track for the vertical movement (up and down) of tank 13. Tank 13, which contains the medium in which the thermoplastic specimens are to be tested, is mounted between vertical frame member 5 and its complementary vertical frame member (not shown) by means subsequently described, is spaced from these members and also spaced from angle iron 9 so that it, tank 13, has freedom of vertical movement. The depth of tank 13 is such that it has a capacity to hold enough material in which to completely immerse specimens which are to be tested.

Sides 14 of tank 13 extend rearwardly of tank 13 and form plates 15 (only one side 14 and only one plate 15 are shown in the accompanying drawings) which pass under angle iron 9 and are spaced therefrom. Each flat plate 15 provides a mounting for a gear 16, each gear 16 being mounted on a plate 15 at the same relative position. The attachment of each gear 16 to a plate 15, each plate 15 being an extension of a side 14 of tank 13, and hence the attachment of each gear 16 to tank 13, is effected through shaft 17 which passes behind tank 13, through each plate 15 and is rotatably mounted to each plate 15. Each gear 16 is rigidly attached on an end of shaft 17.

Shaft 17, at each end thereof, has spacers 18 which serve as members around which locking members 51 hook locking tank 13 in position. One locking member 51, which hooks about a spacer 18, is pivotally connected to vertical frame member 5 and the second locking member (not shown) is pivotally connected, at the same relative position thereon, to the vertical frame member (not shown) which is complementary to vertical frame member 5. As a rule, locking members 51 are so positioned on the vertical frame members described that tank 13 is locked in place when it is in its uppermost position.

Below each gear 16, spaced a suitable distance therefrom and in line therewith is guide wheel 19, which also rides on the track of gear rack 12. Each guide wheel 19 (only one such guide wheel is shown in the accompanying drawings) is mounted on a plate 15 so that each guide wheel 19 is at the same relative position on its plate 15. The attachment of each guide wheel 19 to a plate 15 is effected by means of shaft 20 which passes behind tank 13, through each plate 15 and is rigidly attached to each plate 15. Each guide wheel 19 is rotatably mounted on an end of shaft 20. Another guide wheel 21 is rotatably mounted, one on each plate 15. One guide wheel 21 rides on the vertical frame member 5, the other rides on the vertical frame member (not shown) which is complementary to vertical frame member 5.

With the arrangement, as described, tank 13 can be manually moved up or down, as desired, without tilting with gears 16 and guide wheels 19 riding in the track of gear rack 12. Also tank 13 can be locked in its uppermost position and maintained in this position without tilting. As an aid in manually manipulating tank 13, it is convenient to provide sides 14 of tank 13 with overhanging lips 40, as is clearly shown in FIGURE 2.

In order to insure that tank 13 is maintained in a level position, particularly when filled with a heavy medium, it is customary to attach to tank 13, through plates 15, a chain, counter balancing system 42, as is shown in FIGURES 1 and 2. As is more clearly shown in FIGURE 1, each chain, counter balancing system 42, one complete system provided at each end of tank 13, has a chain 43 which meshes with sprocket 44, sprocket 44 being rotatably mounted on shaft 45, which in turn, is rigidly supported by bar 22. At the free end of each chain 43 is suspended weight 46. Weight 46, attached to the free end of each chain 43, is so chosen as to counter balance the weight of tank 13.

Bar 22, which supports shaft 45, as is shown clearly in FIGURE 1 rests on bar 8 and rests across angle iron 9 and is fixedly attached to each. Bar (not shown) which is complementary to bar 22 rests across angle iron 9 and rests on the bar complementary to bar 8, and is also fixedly attached to each. Bar 22 extends across angle iron 9 to an extent that bar 31, which is smoothly attached to bar 22 as shown in FIGURE 2, extends downward from bar 22 into tank 13, when tank 13 is in its uppermost position, and is spaced from the interior walls of tank 13. The bar (not shown) which is complementary to bar 22 extends across the opposite end of angle iron 9, and in a like manner as described with respect to bar 31, has a bar (not shown) which is complementary to bar 31, smoothly attached thereto and extending into tank 13.

Between the rear wall of tank 13, bar 22 and the bar (not shown) complementary thereto and attached to each of these bars by means of bolts 60, is L shaped rigid member 23. Member 23 serves as a support for one or more stationary hooks 24. Each stationary hook 24 holds in place the bottom end of a plastic specimen which is to be tested. The top of each plastic test specimen is held in position by a movable hook 25, which is in line with and spaced from its complementary hook 24. Each hook 25 is so positioned that it is spaced from its complementary hook 24 when the lever arm to which each hook 25 is attached is in a level position. The space between the top and bottom hooks will be determined in part by the size of the specimens which are being tested. In addition, top and bottom hooks, which hold the test specimens in place, are so positioned that both are within the confines of tank 13 when tank 13 is in its uppermost position.

Each lever arm 26, to which is attached a hook 25 through stem 21, is mounted on and pivots about shaft 27, shaft 27 serving as a fulcrum for each lever arm 26. Shaft 27 is rigidly supported by blocks 28 which in turn are connected to angle iron 9 by means of bolts 50 (only one such shaft and bolt shown in the drawings).

A suitable distance is maintained between each lever arm 26 by means of spacers 29. This distance is such that there is no contact between specimens which are being tested or between sets of hooks which hold the test specimens in place. The actual number of lever arms and sets of hooks, and consequently the number of specimens which can be tested at the same time, will depend in general upon the actual size of tank 13.

The length $(d)$ of each lever arm 26 from its fulcrum (shaft 27) to the member which holds the top of the specimen being tested, in the embodiment shown in the accompanying drawing, hook 25, is generally less than the length $(d')$ of the same lever arm to a point of the lever arm where a force is applied, in the embodiment shown in the accompanying drawing, the point on the lever arm from where a weight 49 is suspended. As a rule, $(d')$ is about three times greater than $(d)$. By providing a length differential between $(d')$ and $(d)$, with $(d')$ being greater than $(d)$, a mechanical advantage is effected with respect to each lever arm. This allows the use of lighter weights to effect the desired stress (force) on each specimen in accordance with the equation:

$$Fd = Wd'$$

In testing a plastic material in order to determine its resistivity to a constant stress in a particular medium and at a particular temperature, tank 13 is filled with the desired medium which is brought to the desired temperature and maintained at this temperature by heaters (not shown).

With tank 13 in its lowest position and the medium which it contains at the desired temperature, test specimens are mounted on hooks 24 and 25, one specimen on each set of hooks.

The exact shape of the test specimens is not critical. Specimens, however, are usually rectangular, as is shown in the accompanying drawings, with the middle of each specimen more narrow than its ends. A specimen, having a narrow area as shown, will rupture under a constant stress at this narrow or "weakened" area. Since all specimens will tend to rupture at this "weakened" area, an accurate evaluation as to the resistivity to stress of each specimen can be made with respect to each of the other specimens being tested.

In the embodiment shown in the accompanying drawings, the members holding the test specimens are hooks. This necessitates providing each test specimen with holes at the extremities thereof as is shown. Metal eyelets 51 are usually provided at each hole in order to insure that the hooks will not tear the material being tested. If desired, clamping members can be used in lieu of the hooks shown. In that event, there is no need to provide the test specimens with holes.

When the test specimens are in place, tank 13 is manually raised and locked in its uppermost position by means of locking members 51. At this position, the test specimens are immersed in the medium contained in tank 13. Weights 49 are then suspended on each lever arm 26 thereby effecting a constant stress on the test specimen which is at the opposite end of that particular lever arm. When a test specimen ruptures, the lever arm to which it was connected will fall, as is clearly shown in FIGURE 3.

In order to automatically indicate when a particular specimen ruptures, microswitches 30 are placed under each lever arm 26. Microswitches 30 are mounted on Z shaped rigid member 32 which is attached to rigid bar 8 with bolts 33 as is clearly shown in FIGURE 3. Each microswitch is part of an electrical circuit (not shown) which is closed when its particular specimen has not ruptured. A timer (not shown) is also part of each electrical circuit and is connected in series to a microswitch. When and if a specimen ruptures, its lever arm drops onto the actuator of its microswitch, opening its electrical circuit and stopping its timer.

In lowering tank 13, locking members 51 unhooked and the tank is lowered manually.

What is claimed is:

1. An apparatus for simultaneously determining the stress-rupture properties of a plurality of test specimens comprising a frame, a gear rack vertically mounted on each end of said frame, a tank closed on the sides and bottom and open at the top, a shaft rotatably mounted on said tank, gears fixed on each end of said shaft, said gears riding on the track of said gear rack with said gears and said tank vertically movable with respect to said frame, said tank capable of containing a meduim in which said specimens are tested, a plurality of upper and lower members, each of said lower members connected to said frame and capable of being atached to the bottom of one of said test specimens, each of said upper members capable of being attached to the top of one of said test specimens, said upper and lower members capable of holding each of said specimens within the confines of said tank lever arms pivotally mounted on said frame and connected to said upper members, one lever arm being connected to one of said upper members, and means to apply a constant stress to each of said specimens through the lever arm and the upper member connected to said lever arm.

2. An apparatus for simultaneously determining the stress rupture properties of a plurality of test specimens comprising a frame, a gear rack vertically mounted on each end of said frame, a tank closed on the sides and bottom and open at the top, a shaft rotatably mounted on said tank, gears fixed on each end of said shaft, said gears riding on the track of said gear rack with said gears and said tank vertically movable with respect to said frame, said tank capable of containing a medium in which said specimens are tested, a plurality of upper and lower members, each of said lower members connected to said frame and capable of being attached to the bottom of one of said test specimens, each of said upper members capable of being attached to the top of one of said test specimens, said upper and lower members capable of holding each of said specimens within the confines of said tank, lever arms pivotally mounted on said frame and connected to said upper members, one lever arm being connected to one of said members, means to apply a constant stress to each of said specimens through the lever arm and upper member connected to said lever arm and means to record the elapsed time to rupture of each of said specimens.

3. An apparatus for simultaneously determining the stress-rupture properties of a plurality of test specimens comprising a frame, a gear rack vertically mounted on each end of said frame, a tank closed on the sides and bottom and open at the top, a shaft rotatably mounted on said tank, gears fixed on each end of said shaft, said gears riding on the track of said gear rack with said gears and said tank vertically movable with respect to said frame, said tank capable of containing a medium in which said specimens are tested, a plurality of upper and lower members, each of said lower members connected to said frame and capable of being attached to the bottom of one of said test specimens, each of said upper members capable of being attached to the top of one of said test specimens, said upper and lower members capable of holding each of said specimens within the confines of said tank, a plurality of lever arms pivotally mounted on said frame and connected to said upper members, each upper member being in line with and spaced from the corresponding lower member when the lever arm connected to said upper member is in a level position and means to apply a constant stress to each of said specimens through the lever arm and the upper member connected to said lever arm.

4. An apparatus for simultaneously determining the stress-rupture properties of a plurality of test specimens comprising a frame, a gear rack vertically mounted on each end of said frame, a tank closed on the sides and bottom and open at the top which is capable of containing a medium in which said specimens are tested, the sides of said tank extending rearwardly thereof forming flat plates, a shaft passing behind said tank through said plates and rotatably mounted on said plates, a gear rigidly connected on each end of said shaft, each of said gears riding in the track of said gear rack when said tank is moved relative to said frame, a plurality of upper and lower members, each of said lower members connected to said frame and capable of being attached to the bottom of one of said test specimens, each of said upper members capable of being attached to the top of one of said test specimens, said upper and lower members capable of holding each of said specimens within the confines of said tank, a plurality of lever arms pivotally mounted on said frame and connected to said upper members, one lever arm being connected to each of said upper members and means to apply a constant stress to each of said specimens through the lever arm and upper member which is connected to said lever arm.

References Cited by the Examiner
UNITED STATES PATENTS

| | | | |
|---|---|---|---|
| 2,185,340 | 1/40 | Howe | 73—15.4 |
| 2,436,317 | 2/48 | Manjoine | 73—15.6 |
| 2,731,164 | 1/56 | Ulinski. | |
| 2,748,597 | 6/56 | Kooistra | 73—95 X |

OTHER REFERENCES

Publication: Bulletin 4208, Creep Testing Machines, Baldwin-Lima-Hamilton Corp., Copyright 1953, pp. 1–3.

RICHARD C. QUEISSER, *Primary Examiner.*

DAVID SCHONBERG, *Examiner.*